Patented Dec. 23, 1941

2,267,302

UNITED STATES PATENT OFFICE 2,267,302

ESTER OF NITRO ALCOHOL

Henry B. Hass, West Lafayette, Ind., and Byron M. Vanderbilt, Cranford, N. J., assignors to Purdue Research Foundation, La Fayette, Ind., a corporation of Indiana No Drawing. Application January 21, 1941, Serial No. 375,258

1 Claim. (Cl. 260—488)

Our invention relates to a new and useful ester of an aliphatic nitro alcohol. More particularly, it relates to 3-nitro-2-butyl acetate which may be represented by the following structural formula:

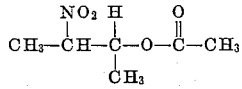

The above compound may be prepared in accordance with any suitable procedure known to the art, such as, for example, by reacting the corresponding nitro alcohol with glacial acetic acid, or ketene. We prefer, however, to prepare this ester by reacting the nitro alcohol with approximately an equivalent amount of acetic anhydride in the presence of a small quantity of an acid catalyst such as sulfuric or phosphoric acid, and a third liquid capable of forming an azeotropic mixture with water. In carrying out this procedure, the acetic anhydride is added slowly to the nitro alcohol at a temperature of from 50–60° C., the mixture being preferably maintained at this temperature level throughout the addition of acetic anhydride. The reaction which takes place, during the formation of this ester, is exothermic, and precautions should therefore be taken to avoid excessively high temperatures, since such conditions have been found to result in yields which are lower than those obtainable when the reaction is carried out under the above-mentioned temperature range. After the entire quantity of acetic anhydride has been added to the nitro alcohol, the resulting mixture is heated to a temperature of 70–80° C. for a period of approximately one-half hour, after which the reaction is substantially complete. The principal impurity contained in such mixture consists of acetic acid which may be separated therefrom by subjecting the crude reaction mixture to distillation under reduced pressure. In this connection, it may be mentioned that prior to distillation the acid catalyst present may be neutralized if desired. However, we prefer to distill the esters under vacuum from the acid medium, since we have found, in certain instances, that ordinary measures taken to neutralize the acid catalyst present, tend to reduce the yield of product. The distillate thus obtained, which consists chiefly of the ester, may be further purified by treatment with water, thereby extracting any acetic acid that was not removed during the distillation step. If layer separation between the ester and water is difficult to effect, a small amount of a salt, such as sodium chloride, may be added to the mixture, after which said ester may be readily separated. The product obtained in this manner is ordinarily sufficiently pure for the majority of technical uses. However, the resulting ester, if desired, may be further purified by subjecting the same to fractional distillation under vacuum.

The nitro alcohol employed in the preparation of the ester of our invention may be satisfactorily prepared by any suitable procedure known to the art. However, we prefer to prepare this compound in accordance with the process of U. S. Patent No. 2,135,444 by Byron M. Vanderbilt. By this procedure a primary or secondary nitroparaffin, and an aliphatic aldehyde are reacted in the presence of an auxiliary solvent such as ethyl alcohol, in the presence of an alkaline catalyst, such as sodium hydroxide, the aldehyde being added slowly to a solution of the nitroparaffin and catalyst and the auxiliary solvent, with thorough agitation.

The preparation of the above ester may be further illustrated by the following specific example:

Example 3-nitro-2-butyl acetate was prepared by slowly adding 102 parts by weight of acetic anhydride to 119 parts by weight of 3-nitro-2-butanol containing approximately 1 part by weight of concentrated sulfuric acid. During the addition of the acetic anhydride, the mixture was thoroughly agitated and maintained at a temperature of approximately 60° C. When all of the acetic anhydride had been added, the temperature of the reaction mixture was increased to 80° C., and maintained at this level for a period of one hour, after which the crude mixture was distilled under vacuum and the portion boiling at 104° C. (10 mm.) was collected. This fraction, which consisted of 3-nitro-2-butyl acetate, was a clear water-white liquid possessing a faint mustard-like odor. In addition to the boiling point stated, the following properties were determined for 3-nitro-2-butyl acetate:

Refractive index _____ $n^{25°}{}_D$—1.4350
Specific gravity _____ $d^{25°}{}_4$—1.0932

While the above data will no doubt be helpful in the identification of this compound, we do not desire to limit ourselves to an ester having these specific properties, since the data given were obtained from a single preparation.

The ester of the present invention has been found to be a satisfactory solvent for various nitrocellulose compositions and may be used in conjunction with such compositions where a high boiling solvent is desired. This compound is similarly useful as an intermediate in the synthesis of numerous organic compounds. Other uses of the ester of our invention will be apparent to those skilled in the art.

Having now described our invention, what we claim is:

3-nitro-2-butyl acetate.

HENRY B. HASS.
BYRON M. VANDERBILT.